(12) United States Patent
Ganesan et al.

(10) Patent No.: US 12,401,591 B2
(45) Date of Patent: Aug. 26, 2025

(54) DPU CONTROL/MANAGEMENT OFFLOAD SYSTEM

(71) Applicant: Dell Products L.P., Round Rock, TX (US)

(72) Inventors: Senthil Kumar Ganesan, San Ramon, CA (US); Venkatesan Mahalingam, Pleasanton, CA (US); Vinoth Kumar Arumugam, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 18/106,124

(22) Filed: Feb. 6, 2023

(65) Prior Publication Data
US 2024/0267332 A1    Aug. 8, 2024

(51) Int. Cl.
*H04L 47/125*     (2022.01)
*H04L 41/40*      (2022.01)

(52) U.S. Cl.
CPC ............ *H04L 47/125* (2013.01); *H04L 41/40* (2022.05)

(58) Field of Classification Search
CPC .............................. H04L 47/125; H04L 41/40
See application file for complete search history.

(56) References Cited

U.S. PATENT DOCUMENTS

2023/0109396 A1*  4/2023  Jain ..................... H04L 63/0236
                                                        709/224

FOREIGN PATENT DOCUMENTS

WO    WO-2023279050 A1 *  1/2023  ............. H04L 12/02

* cited by examiner

*Primary Examiner* — Suraj M Joshi
(74) *Attorney, Agent, or Firm* — Joseph Mencher

(57) ABSTRACT

A Data Processing Unit (DPU) control/management offload system includes a first networking device that is coupled to a DPU. The first networking device identifies the DPU, and generates a first virtual networking device in the first networking device for the DPU. The first networking device then offloads control protocol(s) and/or management operation(s) from the DPU using the first virtual networking device, which may include receiving a control communication that is directed to the DPU, determining that the control communication utilizes the control protocol(s) and, in response, redirecting the control communication to the first virtual networking device and processing the control communication using the first virtual networking device. The processing the control communication using the first virtual networking device may include at least one of: programming the DPU based on the control communication, programming route(s) in the first virtual networking device, or transmitting a control communication response.

20 Claims, 9 Drawing Sheets

DPU CONTROL/MANAGEMENT OFFLOAD SYSTEM

BACKGROUND

The present disclosure relates generally to information handling systems, and more particularly to offloading control and management from Data Processing Unit(s) used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices know in the art, sometimes include Data Processing Units (DPUs) or other programmable specialized electronic circuits that provide for hardware acceleration of data processing for data-centric computing, with those DPUs often used to offload data processing operations from a Central Processing Units (CPU), networking device, storage device, security device, and/or other systems utilized by the server device. However, such DPUs have limited resources for offloading the data processing operations discussed above, and often may be dedicated to offloading processing operations from only one of the systems utilized by the server device. For example, if a DPU is used to offload data processing operations from the networking device utilized by its server device, each of the networking control protocol stacks used to perform those data processing operations in place of the networking device must run on the DPU, and may prevent or limit the DPU from offloading processing operations from the CPU, storage device, and/or security device utilized by the server device.

Furthermore, such DPUs/server devices are often provided in datacenters that segregate the administrators of different infrastructure in the datacenter. For example, a datacenter may have a networking administrator that manages the networking infrastructure (e.g., switch devices) in the datacenter, and a compute administrator that manages the compute infrastructure (e.g., server devices) in the datacenter. When DPUs in server devices such datacenters are utilized to offload data processing operations from the switch devices in those datacenters, networking requests that are conventionally the responsibility of the networking administrator because the responsibility of the compute administrator. For example, networking control operations such as the creation of a new Virtual Local Area Network (VLAN) in such a scenario will require a VLAN creation request to be handled by the compute administrator that manages the server device that includes the DPU offloading the processing operations from the switch devices, rather than the networking administrator that manages those switch devices.

Accordingly, it would be desirable to provide a DPU control/management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Data Processing Unit (DPU) control/management offload engine that is configured to: identify a DPU; generate a first virtual networking device in the IHS for the DPU; and offload at least one control protocol from the DPU using the first virtual networking device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
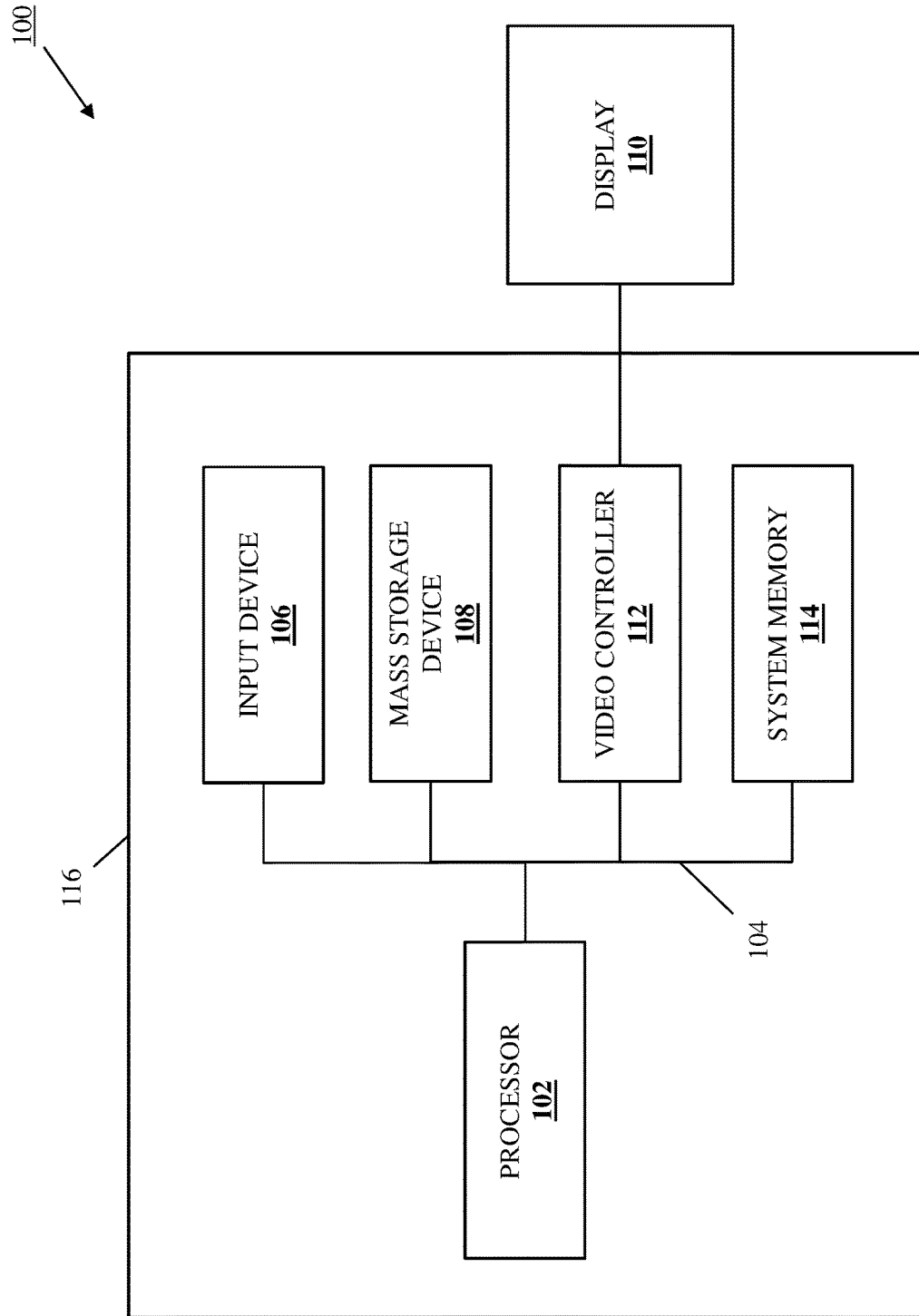
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
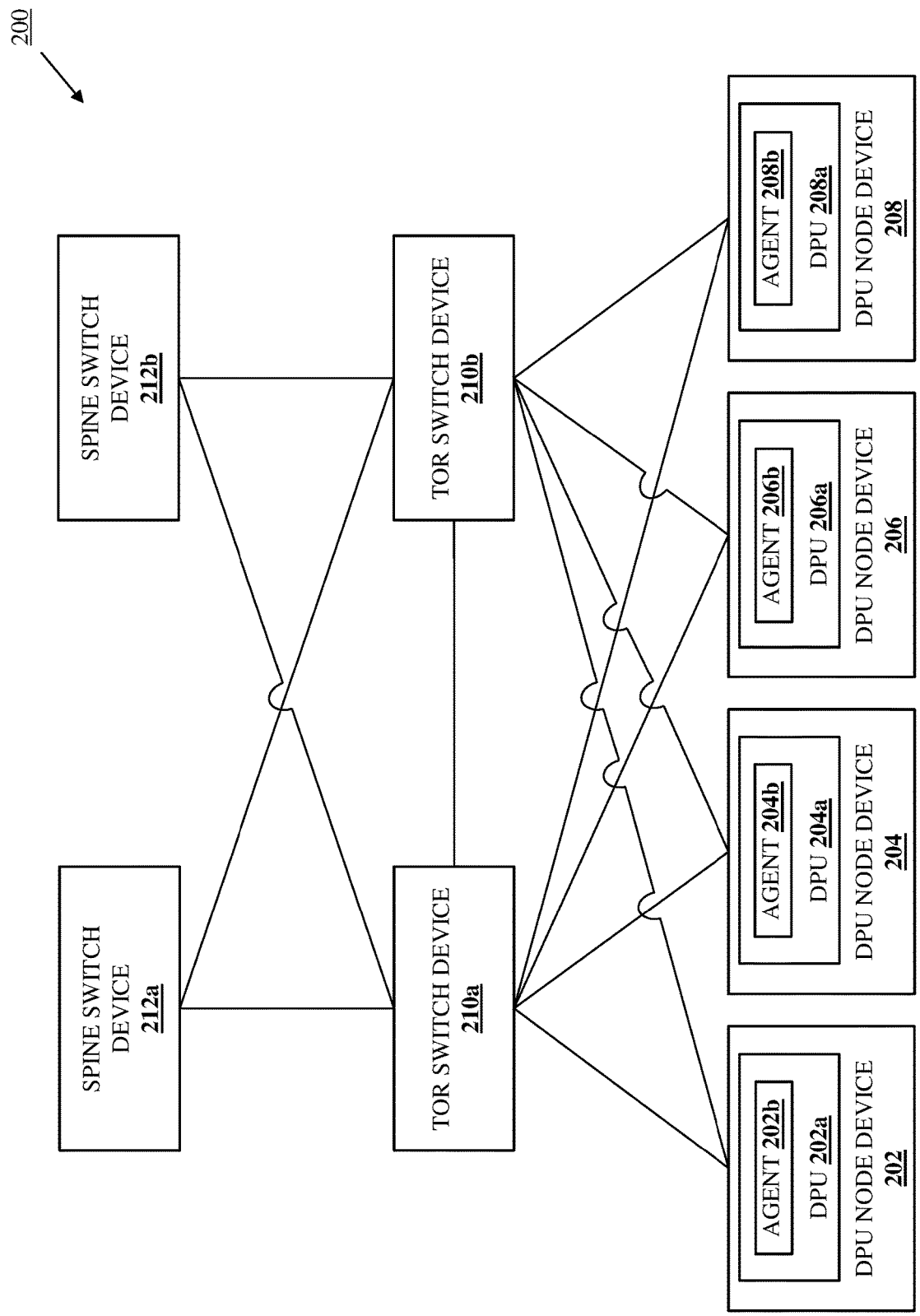
FIG. 2 is a schematic view illustrating an embodiment of a networked system that may include the DPU control/management offload system of the present disclosure.

Referring now to FIG. 2, an embodiment of a networked system 200 is illustrated that may include the DPU control/management offload system of the present disclosure. In the illustrated embodiment, the networked system 200 includes a plurality of DPU node devices 202, 204, 206, and 208. In an embodiment, the DPU node devices 202-208 may be provided by the IHS 100 discussed above with reference to FIG. 1, and/or may include some or all of the components of the IHS 100, and in specific examples may be provided by server devices or other computing devices that one of skill in the art in possession of the present disclosure would recognize as including the DPUs discussed below. However, while illustrated and discussed as being provided by server devices, one of skill in the art in possession of the present disclosure will recognize that DPU node devices provided in the networked system 200 may include any devices that may be configured to operate similarly as the DPU node devices discussed below. Furthermore, while four DPU node devices are provided in the examples discussed below, one of skill in the art in possession of the present disclosure will appreciate how networked systems with fewer or more DPU node devices will fall within the scope of the present disclosure as well.

In the illustrated embodiment, each of the DPU node devices 202-208 includes a DPU that has been provided with an agent, with the DPU node device 202 having a DPU 202*a* provided with an agent 202*b*, the DPU node device 204 having a DPU 204*a* provided with an agent 204*b*, the DPU node device 206 having a DPU 206*a* provided with an agent 206*b*, and the DPU node device 208 having a DPU 208*a* provided with an agent 208*b*. However, while four DPUs are provided in the examples discussed below, one of skill in the art in possession of the present disclosure will appreciate how networked systems with fewer or more DPUs will fall within the scope of the present disclosure as well. Furthermore, as described in further detail below, in some embodiments the agents 202*b*-208*b* may initially be provided on the DPUs 202*a*-208*a*, respectively, with relatively limited functionality that is configured to, for example, allow the DPUs 202*a*-208*a* to be discovered and configured as discussed below, and may be provided with any additional functionality described below after discovery of their corresponding DPU 202*a*-208*a*. However, while the initial provisioning of "limited functionality" agents has been described, the provisioning of "fully functional" agents on the DPUs in the DPU node devices prior to DPU discovery is envisioned as falling within the scope of the present disclosure as well.

In an embodiment, a plurality of networking devices may be coupled to the DPU node devices 202-208. For example, in the embodiments illustrated and described below, a pair of Top Of Rack (TOR) switch devices 210*a* and 210*b* are each coupled to each of the DPU node devices 202-208, as well as each other, and are configured to perform the DPU control/management offload functionality of the present disclosure. As will be appreciated by one of skill in the art in possession of the present disclosure, the coupling of the TOR switch devices 210*a* and 210*b* and the DPU node devices 202-208 may include data communication links (i.e., providing a data network), management communication links (e.g., providing a management network), and/or any other communications couplings known in the art. In an embodiment, each of the TOR switch devices 210*a* and 210*b* may be provided by the IHS 100 discussed above with reference to FIG. 1, and/or may include some or all of the components of the IHS 100, and in a specific example the TOR switch devices 210*a* and 210*b* may be provided in a rack with the DPU node devices 202-208. However, while TOR switch devices are illustrated and discussed as being directly coupled to the DPU node devices 202-208 in a rack and configured to perform the DPU control/management offload functionality of the present disclosure, one of skill in the art in possession of the present disclosure will recognize that other networking devices (or other computing devices such as server devices) may be provided in the networked system 200 and configured to perform the DPU control/management offload functionality of the present disclosure while remaining within its scope as well.

Furthermore, in the embodiments illustrated and described below, the networking devices coupled to the DPU node devices 202-208 include a pair of spine switch devices 212*a* and 212*b* that are each coupled to each of the TOR switch devices 210*a* and 210*b*, as well as to a network (not illustrated) that may be provided by a Local Area Network (LAN), the Internet, combinations thereof, and/or other networks that would be apparent to one of skill in the art in possession of the present disclosure. In an embodiment, each of the spine switch devices 212*a* and 212*b* may be provided by the IHS 100 discussed above with reference to FIG. 1, and/or may include some or all of the components of the IHS 100, and one of skill in the art in possession of the present disclosure will appreciate how the spine switch devices 212*a* and 212*b* may couple the TOR switch devices 210*a* and 210*b* (and their connected DPU node devices 202-208) to any of a variety of other devices via the network discussed above. As discussed above, while TOR switch devices are illustrated and discussed as being directly coupled to the DPU node devices 202-208 and configured to perform the DPU control/management offload functionality of the present disclosure, in some embodiments the spine switch devices 212a-212b may be configured to perform the DPU control/management offload functionality of the present disclosure while remaining within its scope as well.

Furthermore, while a specific networked system 200 has been illustrated and described, one of skill in the art in possession of the present disclosure will recognize that the DPU control/management offload system of the present disclosure may be provided by a variety of components and component configurations while remaining within the scope of the present disclosure as well. For example, while illustrated and described herein as offloading networking control and management functionality from DPUs, one of skill in the art in possession of the present disclosure will appreciate how the DPUs may be replaced by storage systems or other device to provide for the offloading of networking control and/or management functionality from those storage systems or other devices while remaining within the scope of the present disclosure as well.

Figure 3:
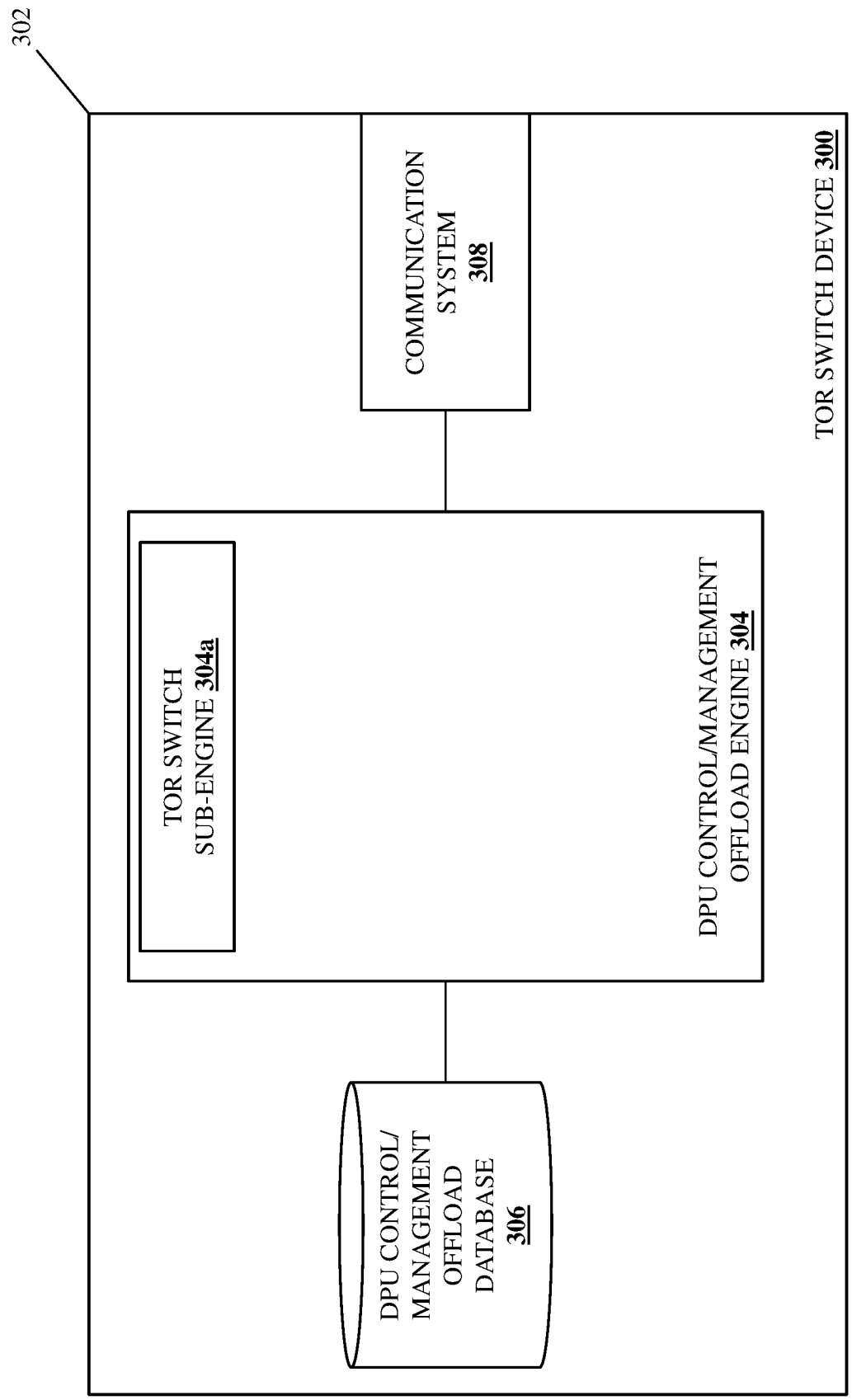
FIG. 3 is a schematic view illustrating an embodiment of a TOR switch device that may be included in the networked system of FIG. 2 and that may provide the DPU control/management offload functionality of the present disclosure.

Referring now to FIG. 3, an embodiment of a TOR switch device 300 is illustrated that may provide either of the TOR switch devices 210a and 210b discussed above with reference to FIG. 2. As such, the TOR switch devices 300 may be provided by the IHS 100 discussed above with reference to FIG. 1 and/or may include some or all of the components of the IHS 100. Furthermore, while illustrated and discussed as being provided by a TOR switch device, one of skill in the art in possession of the present disclosure will recognize that the functionality of the TOR switch device 300 discussed below may be provided by other networking devices or computing devices that are configured to operate similarly as the TOR switch device 300 discussed below. In the illustrated embodiment, the TOR switch device 300 includes a chassis 302 that houses the components of the TOR switch device 300, only some of which are illustrated and discussed below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a DPU control/management offload engine 304 that is configured to perform the functionality of the DPU control/management offload engines and/or TOR switch devices discussed below. In the embodiment illustrated in FIG. 3, the memory system includes instructions that, when executed by the processing system, cause the processing system to provide a TOR switch sub-engine 304a that is included in the DPU control/management offload engine 304 and that is configured to perform the functionality of the TOR switch sub-engines, DPU control/management offload engines, and/or TOR switch devices discussed below. Furthermore, as discussed in further detail below, the memory system may be provided instructions that, when executed by the processing system, cause the processing system to provide virtual DPU (vDPU) switch sub-engines (also called "switch instances") that are configured to perform the networking control and management functionality of the vDPU switch sub-engines, switch instances, DPU control/management offload engines, and/or TOR switch devices discussed below.

The chassis 302 may also house a storage system (not illustrated, but which may include the storage 108 discussed above with reference to FIG. 1) that is coupled to the DPU control/management offload engine 304 (e.g., via a coupling between the storage system and the processing system) and that includes a DPU control/management offload database 306 that is configured to store any of the information utilized by the DPU control/management offload engine 304 discussed below. The chassis 302 may also house a communication system 308 that is coupled to the DPU control/management offload engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific TOR switch device 300 has been illustrated and described, one of skill in the art in possession of the present disclosure will recognize that TOR switch devices (or other devices operating according to the teachings of the present disclosure in a manner similar to that described below for the TOR switch device 300) may include a variety of components and/or component configurations for providing conventional networking device functionality, as well as the functionality discussed below, while remaining within the scope of the present disclosure as well.

Figure 4:
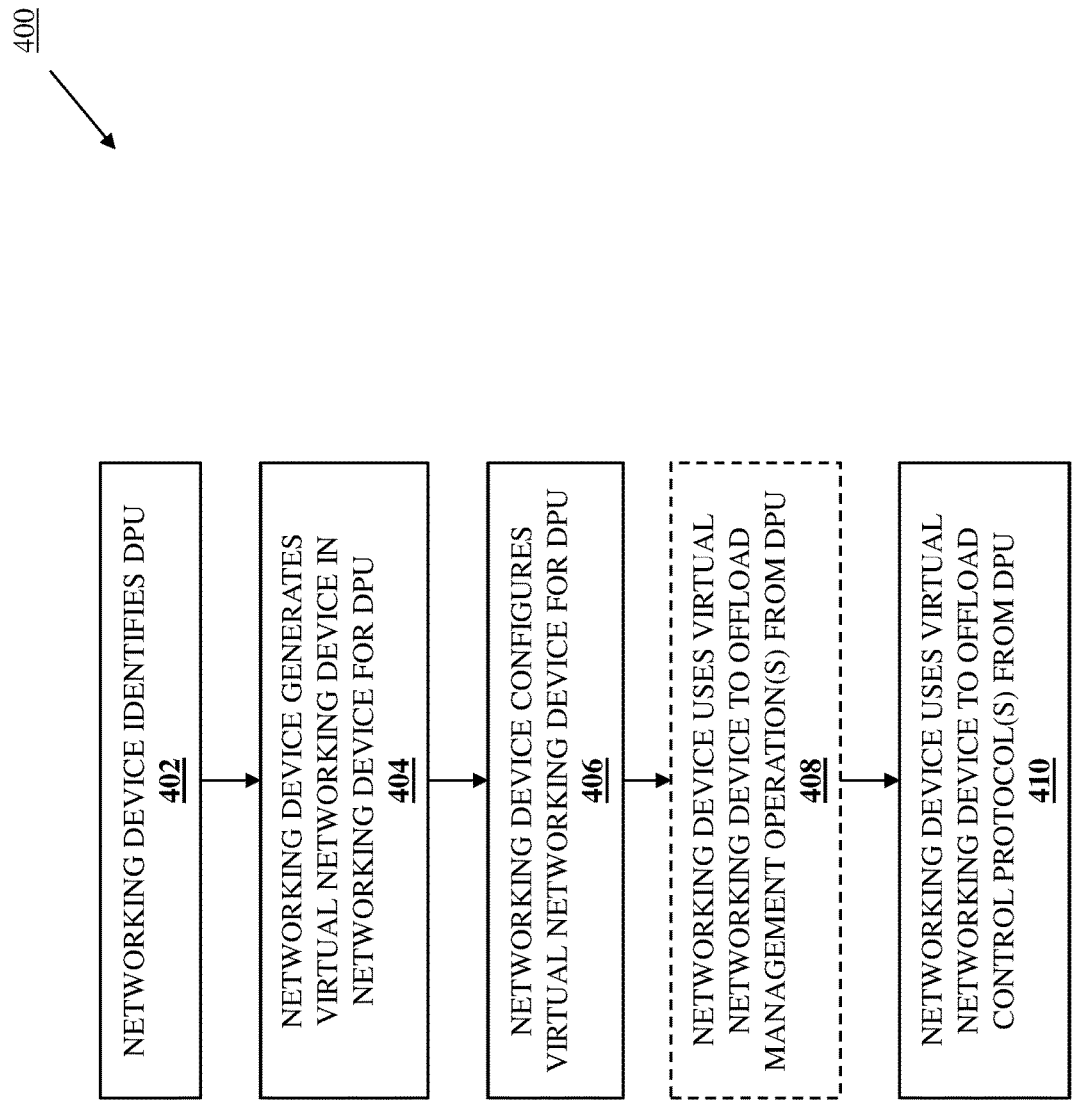
FIG. 4 is a flow chart illustrating an embodiment of a method for offloading control and management from a DPU.

Referring now to FIG. 4, an embodiment of a method 400 for offloading control and management for a DPU is illustrated. As discussed below, embodiments of the systems and methods of the present disclosure provide a networking device that offloads control protocols and/or management operations from DPUs. For example, the DPU control/management offload system of the present disclosure may include a first networking device that is coupled to a DPU. The first networking device identifies the DPU, and generates a first virtual networking device in the first networking device for the DPU. The first networking device then offloads control protocol(s) and/or management operation(s) from the DPU using the first virtual networking device, which may include receiving a control communication that is directed to the DPU, determining that the control communication utilizes the control protocol(s) and, in response, redirecting the control communication to the first virtual networking device and processing the control communication using the first virtual networking device. The processing the control communication using the first virtual networking device may include at least one of: programming the DPU based on the control communication, programming route(s) in the first virtual networking device, or transmitting a control communication response. As such, resources of DPUs may be conserved for performing data processing operations via the offloading of control protocols and/or management operations by a connected networking device.

Figure 5A:
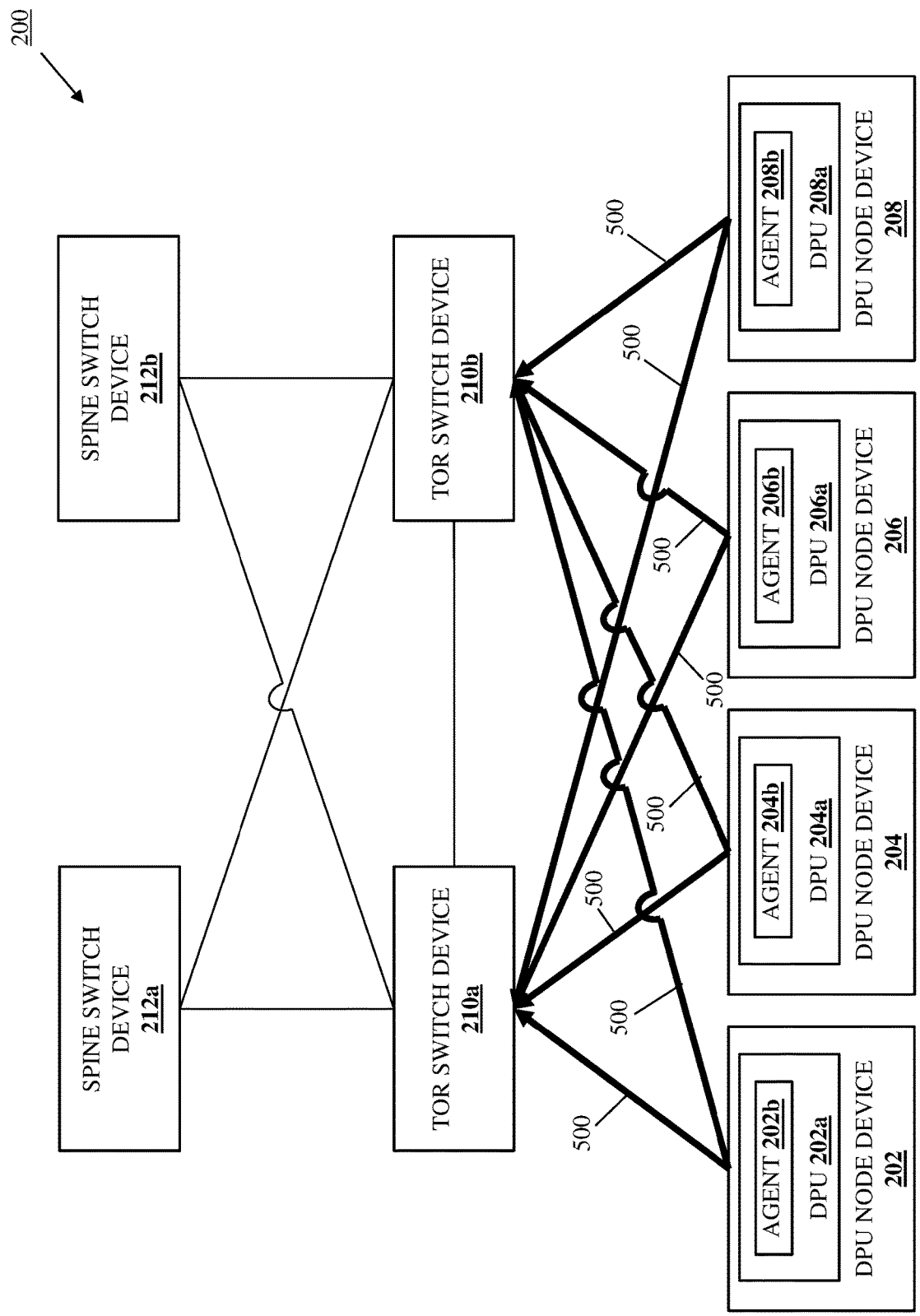
FIG. 5A is a schematic view illustrating an embodiment of the networked system operating during the method of FIG. 4.
Figure 5B:
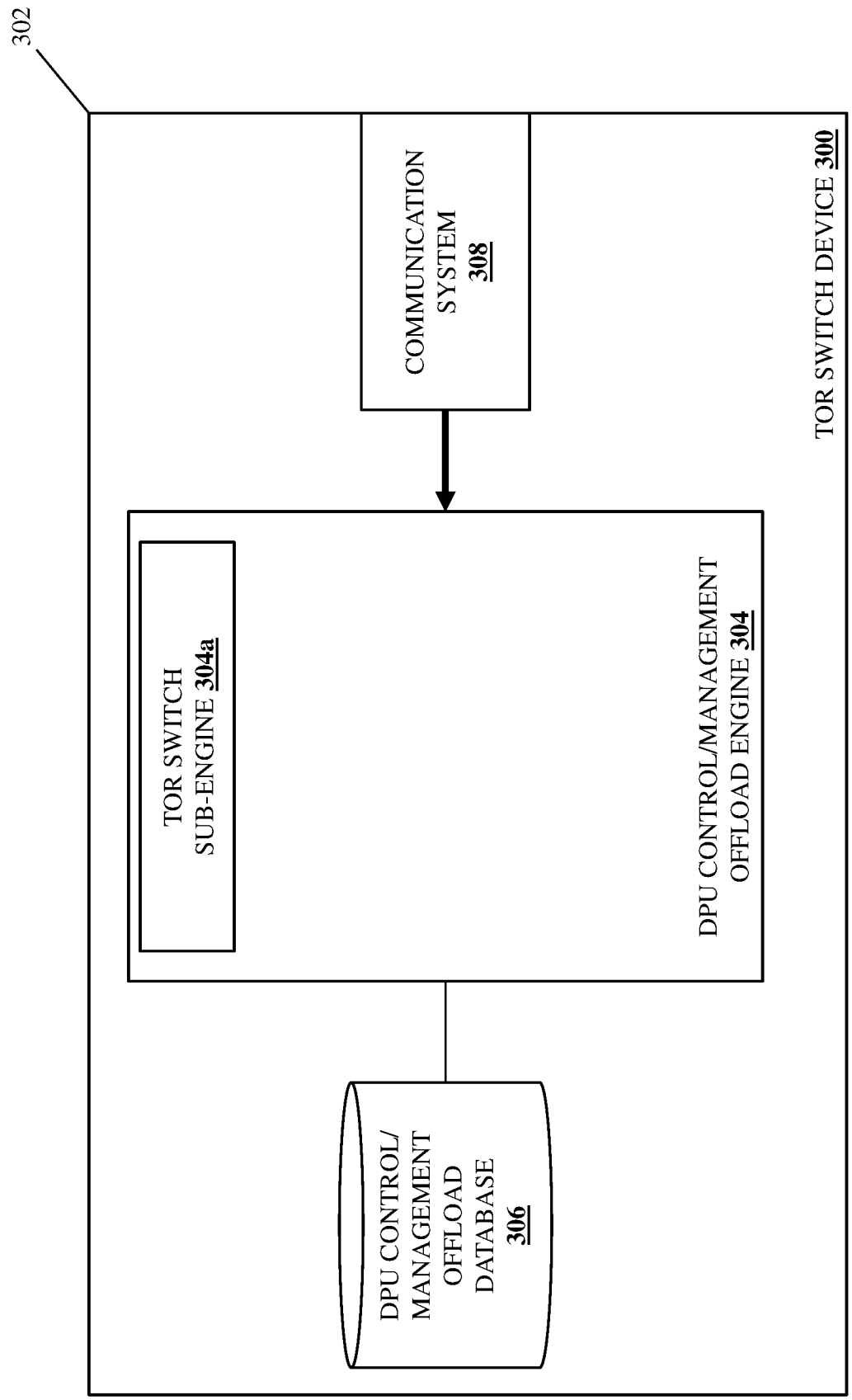
FIG. 5B is a schematic view illustrating an embodiment of the TOR switch device of FIG. 3 operating during the method of FIG. 4.

The method 400 begins at block 402 where a networking device identifies a DPU. In an embodiment, at block 402, the TOR switch sub-engine 304a in the DPU control/management offload engine 304 of each of the TOR switch devices 210a/300 and 210b/300 may identify each of the DPUs 204a-208a in the DPU node devices 202-208. For example, with reference to FIGS. 5A and 5B, the TOR switch sub-engine 304a in the DPU control/management offload engine 304 of each of the TOR switch devices 210a/300 and 210b/300 may perform DPU discovery operations 500 via their communication systems 308 and with the agents 202b-208b provided on each of the DPUs 202a. In a specific example, the DPU discovery operations 500 may include the TOR switch sub-engine 304a in the DPU control/management offload engine 304 of each of the TOR switch devices 210a/300 and 210b/300 exchanging Link Layer Discovery Protocol (LLDP) communications via their communication systems 308 and with each of the agents 202b-208b provided on each of the DPUs 202a, which one of skill in the art in possession of the present disclosure will appreciate may provide for the discovery of each of the DPUs 202a-208a provided with those agents 202b-208b, as well as the retrieval of any of a variety of DPU information that would be apparent to one of skill in the art in possession of the present disclosure. As discussed above, in some embodiments the agents 202b-208b may initially be configured with limited functionality that allows for the DPU discovery operations 500, and as discussed below those agents 202b-208b may subsequently be configured with other functionality required to perform the method 400 subsequent to the discovery of their corresponding DPU. However, as discussed above, the provisioning of "fully functional" agents on the DPUs prior to DPU discovery is envisioned as falling within the scope of the present disclosure as well.

In another specific example, the identification by the TOR switch sub-engine 304a in the DPU control/management offload engine 304 of each of the TOR switch devices 210a/300 and 210b/300 of each of the DPUs 204a-208a in the DPU node devices 202-208 may be based on manual provisioning operations rather than the discovery operations discussed above. For example, a network administrator or other user of the networked system 200 may manually provision the identities of each of the DPUs 202a-208a in the DPU node devices 202-208, as well any of a variety of DPU information that would be apparent to one of skill in the art in possession of the present disclosure, in the DPU control/management offload database 306 of each of the TOR switch devices 210a/300 and 210b/300, respectively. Thus, at block 402 the TOR switch sub-engine 304a in the DPU control/management offload engine 304 of each of the TOR switch devices 210a/300 and 210b/300 may identify the DPUs 204a-208a in the DPU node devices 202-208 via their identification in its DPU control/management offload database 306. However, while two specific examples of the identification of DPUs has been described, one of skill in the art in possession of the present disclosure will appreciate how the DPUs of the present disclosure may be identified in other manners that will fall within the scope of the present disclosure as well.

The method 400 then proceeds to block 404 where the networking device generates a virtual networking device in the networking device for the DPU. In an embodiment, at block 404 and in response to identifying the DPUs at block 402, the TOR switch sub-engine 304a in the DPU control/management offload engine 304 of each of the TOR switch devices 210a/300 and 210b/300 may generate a virtual networking device (also referred to as a "switch instance") for each of the DPUs identified at block 402. For example, each virtual networking device generated for a respective DPU may be generated using DPU information that was retrieved via the discovery of that DPU, that was included in the DPU control/management offload database 306 in association with the identification of that DPU, and/or that is available via other techniques that would be apparent to one of skill in the art in possession of the present disclosure. As discussed below, any virtual networking device generated for a DPU identified at block 402 may include a virtual interface for each physical interface included on that DPU, with the virtual interface derived based on outgoing interface metadata, connectivity information, and/or other information that would be apparent to one of skill in the art in possession of the present disclosure. To provide a specific example, if an outgoing physical port or other interface on a TOR switch device identified by "port 1/25" is connected to an incoming physical port or other interface on the DPU identified by "1/1", the virtual networking device generated for that DPU may be provided a virtual interface identified by "vEth1".

Figure 6:
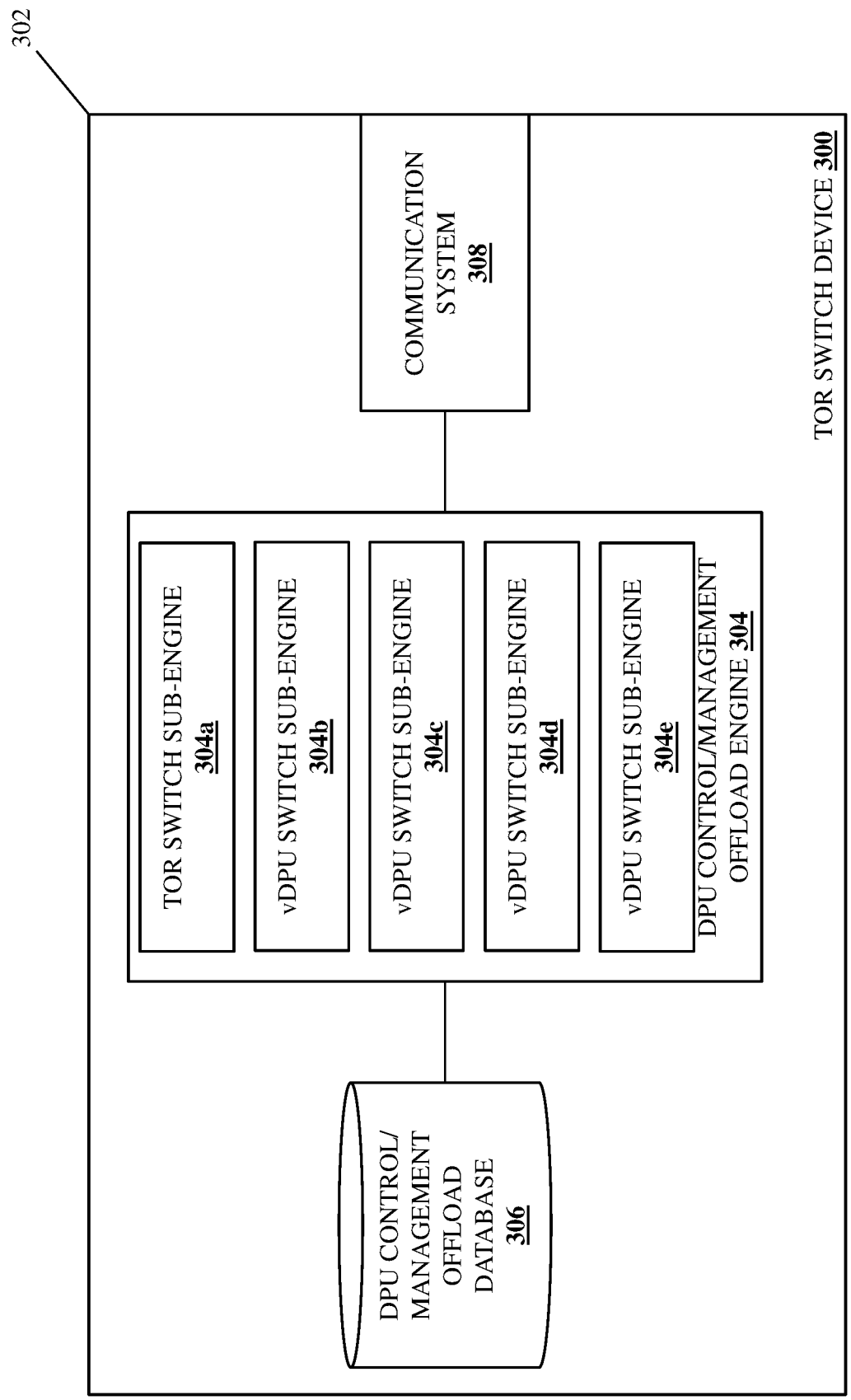
FIG. 6 is a schematic view illustrating an embodiment of the TOR switch device of FIG. 3 operating during the method of FIG. 4.

With reference to FIG. 6, the DPU control/management offload engine 304 in the TOR switch device 300 is illustrated following the generation of virtual networking devices for identified DPUs, with the TOR switch sub-engine 304a in the DPU control/management offload engine 304 having generated a first virtual networking device provided by a virtual DPU (vDPU) switch sub-engine 304b that was generated for a first DPU identified at block 402, a second virtual networking device provided by a vDPU switch sub-engine 304c that was generated for a second DPU identified at block 402, a third virtual networking device provided by a vDPU switch sub-engine 304d that was generated for a third DPU identified at block 402, and a fourth virtual networking device provided by a vDPU switch sub-engine 304e that was generated for a fourth DPU identified at block 402. As will be appreciated by one of skill in the art in possession of the present disclosure, the pair of TOR switch devices 210a and 210b provided in the specific embodiments illustrated and described herein may operate in many situations to provide redundant connectivity to any of the DPU node devices 202-208 and their DPUs 202a-208a, respectively, and thus the example in FIG. 6 illustrates how, for any particular DPU identified at block 402, the TOR switch devices 210a and 210b may generate a pair of virtual networking devices for each DPU.

The method 400 then proceeds to block 406 where the networking device configures the virtual networking device in the networking device for the DPU. In an embodiment, at block 406, the TOR switch sub-engine 304a in the DPU control/management offload engine 304 of each of the TOR switch devices 210a/300 and 210b/300 may perform a variety of configuration operations on the virtual networking devices generated at block 404. For example, at block 406, the TOR switch sub-engine 304a in the DPU control/management offload engine 304 of each of the TOR switch devices 210a/300 and 210b/300 may establish communications between each of the DPUs 202a-208a and the respective virtual networking device it generated for them using connection establishment communications similar to those defined by the Institute of Electrical and Electronics Engineers (IEEE) for the Port Extender CubSat Space Protocol (PE-CSP), proprietary Inter Process Communication (IPC) connection establishment messages or other communications, and/or other connection establishment techniques that would be apparent to one of skill in the art in possession of the present disclosure. Similarly, the TOR switch sub-engine 304a in the DPU control/management offload engine 304 of each of the TOR switch devices 210a/300 and 210b/300 may establish communications between any pair of the virtual networking devices as well. Furthermore, following the establishment of the connection between each DPU and the virtual networking devices generated for it, as well as the connection(s) between virtual networking devices, a corresponding session may be established via that connection using any of a variety of session establishment techniques that would be apparent to one of skill in the art in possession of the present disclosure, and one of skill in the art in possession of the present disclosure will appreciate how those sessions may be utilized for the primary/secondary elections, control communication exchange, and/or any other functionality described below.

As discussed above, the pair of TOR switch devices 210a and 210b provided in the specific embodiments illustrated and described herein may operate in many situations to provide redundant connectivity to any of the DPU node devices 202-208 and their DPUs 202a-208a, respectively. As such, for any particular DPU identified at block 402, the virtual networking device generated by one of the TOR switch devices 210a and 210b for that DPU may be designated as a primary virtual networking device for that DPU, and the virtual networking device generated by the other of the TOR switch devices 210a and 210b for that DPU may be designated as a secondary virtual networking device for that DPU, and one of skill in the art in possession of the present disclosure will recognize how the designations of the virtual networking devices generated by the TOR switch devices 210a and 210b for any particular DPU may be performed using any of a variety of primary/secondary election techniques and/or primary/secondary parameters known in the art.

Figure 7:
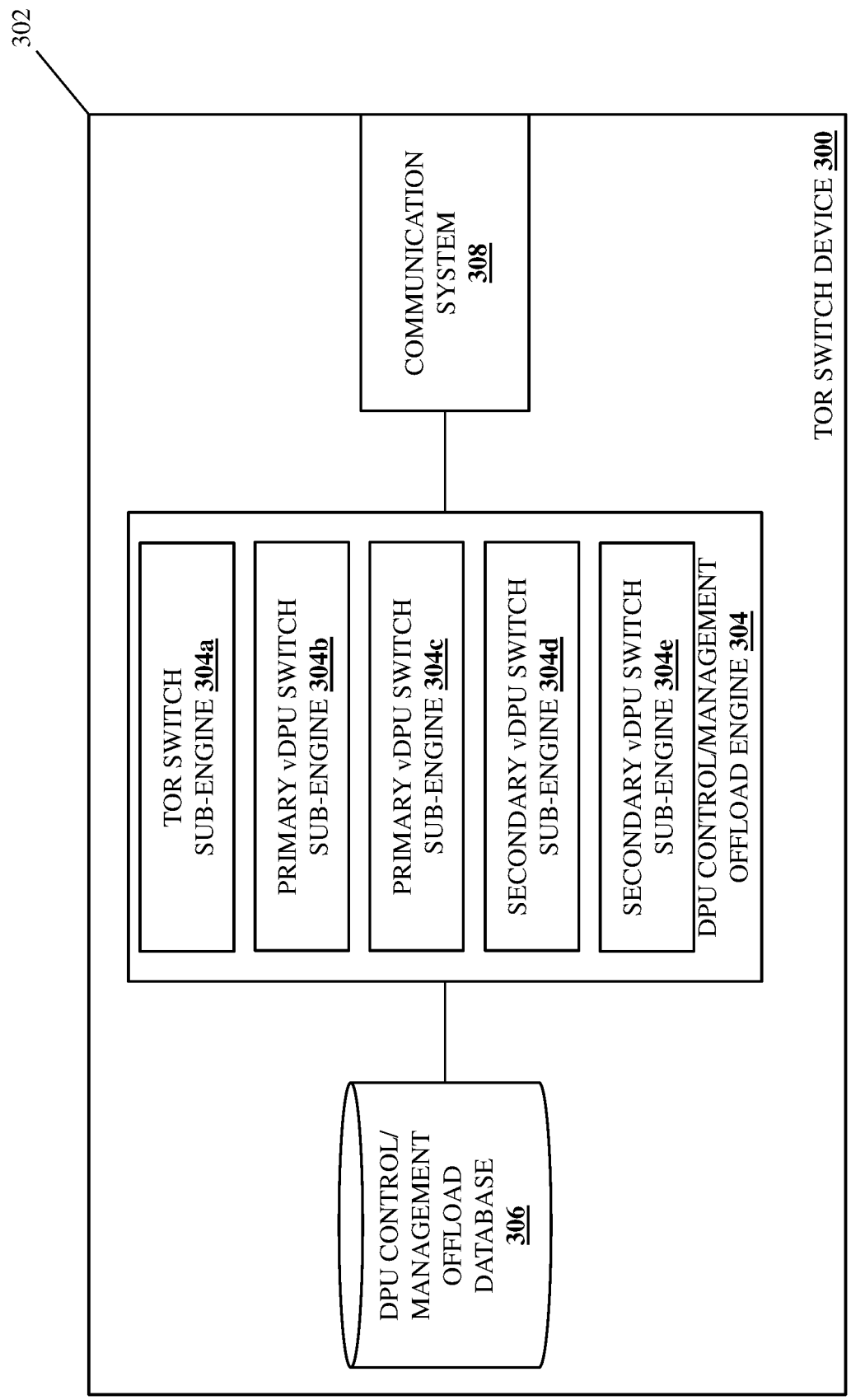
FIG. 7 is a schematic view illustrating an embodiment of the TOR switch device of FIG. 3 operating during the method of FIG. 4.

With reference to FIG. 7, the DPU control/management offload engine 304 in the TOR switch device 300 is illustrated following the designation of virtual networking devices for identified DPUs, with the TOR switch sub-engine 304a in the DPU control/management offload engine 304 having designated the first virtual networking device that was generated for a first DPU identified at block 402 as a primary virtual networking device to provide a primary virtual DPU (vDPU) switch sub-engine 304b, the second virtual networking device that was generated for a second DPU identified at block 402 as a primary virtual networking device to provide a primary vDPU switch sub-engine 304c, the third virtual networking device that was generated for a third DPU identified at block 402 as a secondary virtual networking device to provide a secondary vDPU switch sub-engine 304d, and the fourth virtual networking device that was generated for a fourth DPU identified at block 402 as a secondary virtual networking device to provide a secondary vDPU switch sub-engine 304b.

Figure 8:
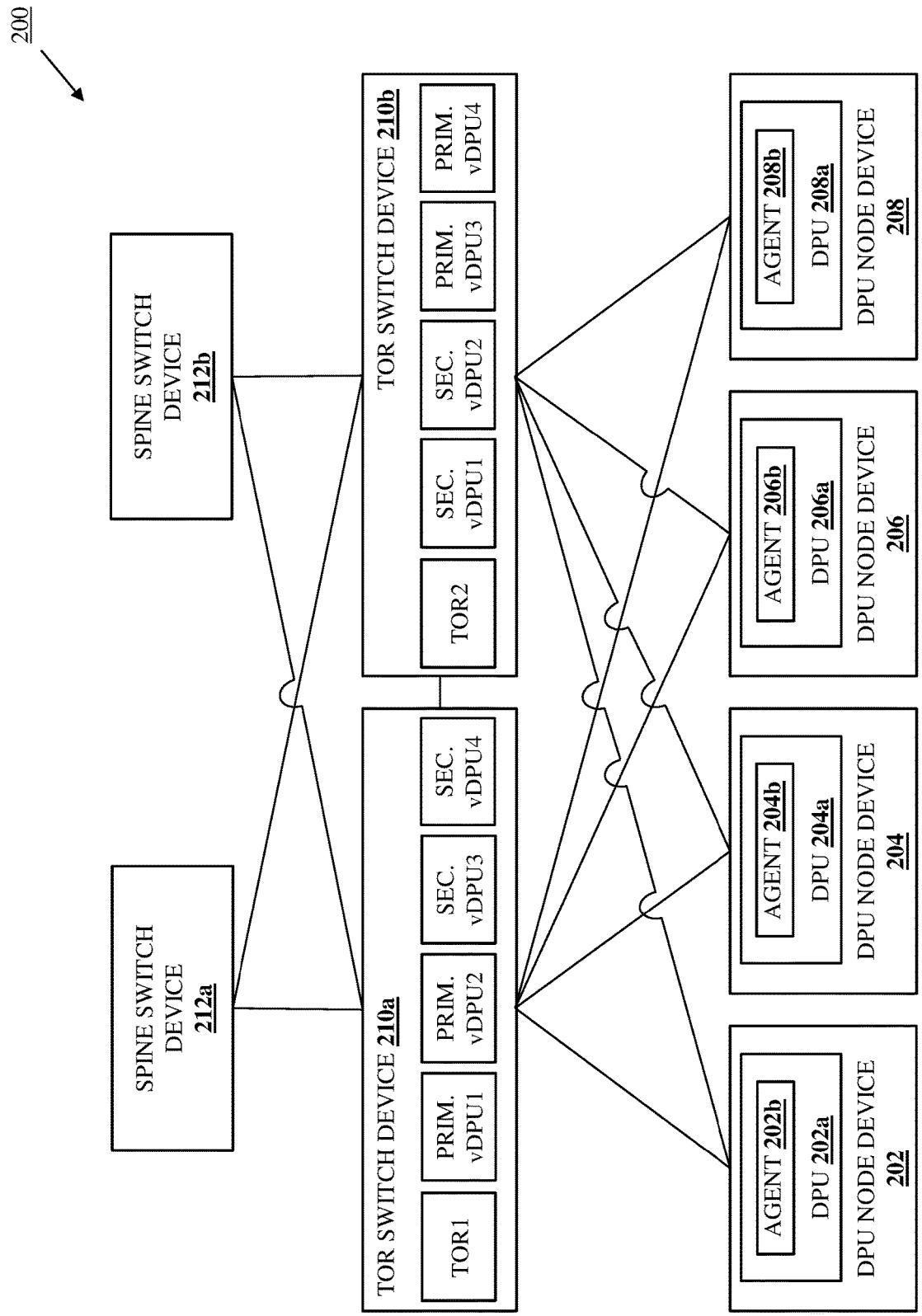
FIG. 8 is a schematic view illustrating an embodiment of the networked system operating during the method of FIG. 4.

For example, with reference to FIG. 8, the networked system 200 is illustrated with the TOR switch sub-engine 304a in each of the TOR switch devices 210a and 210b identified by "TOR1" and "TOR2". Furthermore, FIG. 8 illustrates how, following block 406, the TOR switch device 210a has designated one of its virtual networking devices as a primary virtual networking device (e.g., one of the primary vDPU switch sub-engines in FIG. 7) for the DPU 202a that is identified by "PRIM. vDPU1", and the TOR switch device 210b has designated one of its virtual networking devices as a secondary virtual networking device (e.g., one of the secondary vDPU switch sub-engines in FIG. 7) for the DPU 202a that is identified by "SEC. vDPU1". Similarly, the TOR switch device 210a has designated one of its virtual networking devices as a primary virtual networking device (e.g., one of the primary vDPU switch sub-engines in FIG. 7) for the DPU 204a that is identified by "PRIM. vDPU2", and the TOR switch device 210b has designated one of its virtual networking devices as a secondary virtual networking device (e.g., one of the secondary vDPU switch sub-engines in FIG. 7) for the DPU 204a that is identified by "SEC. vDPU2".

Similarly, the TOR switch device 210b has designated one of its virtual networking devices as a primary virtual networking device (e.g., one of the primary vDPU switch sub-engines in FIG. 7) for the DPU 206a that is identified by "PRIM. vDPU3", and the TOR switch device 210a has designated one of its virtual networking devices as a secondary virtual networking device (e.g., one of the secondary vDPU switch sub-engines in FIG. 7) for the DPU 206a that is identified by "SEC. vDPU3". Similarly, the TOR switch device 210b has designated one of its virtual networking devices as a primary virtual networking device (e.g., one of the primary vDPU switch sub-engines in FIG. 7) for the DPU 208a that is identified by "PRIM. vDPU4", and the TOR switch device 210a has designated one of its virtual networking devices as a secondary virtual networking device (e.g., one of the secondary vDPU switch sub-engines in FIG. 7) for the DPU 208a that is identified by "SEC. vDPU4".

As will be appreciated by one of skill in the art in possession of the present disclosure, a network operating system in each of the TOR switch devices 210a and 210b may provide a control plane, a management plane, and a data plane, and thus the virtual networking devices generated in the TOR switch device 210a and 210b may operate to provide a control plane, a management plane, and a data plane. In some embodiments, the virtual networking device configuration performed at block 406 may include configuring the virtual networking devices in the TOR switch device 210a and 210b to provide the control plane and the management plane in an "active-active" mode, while providing the data plane in an "active-standby" mode. In other words, for any particular DPU, the primary and secondary virtual networking devices provided for that DPU will both operate to perform control operations and management operations for that DPU (i.e., "active-active"), while only the primary virtual networking device provided for that DPU will perform data operations while the secondary virtual networking device will remain on standby until the primary networking device becomes unavailable (i.e., "active-standby").

As such, both the primary and secondary virtual networking device may be configured to share the control operation and management operation load (while also sharing any control operations or management operations with the other networking device), while the primary virtual networking device may be configured to perform data operations (e.g., programming its DPU or the agent in its DPU and sharing those data operations with its secondary virtual networking device, receiving and executing a request from its secondary virtual networking device to program its DPU or the agent in its DPU, etc.).

As discussed in further detail below, in some embodiments, the virtual networking devices provided by the TOR switch devices 210a and 210b may offload all control protocols from the DPUs for which they were generated. However, in other embodiments, the virtual networking devices provided by the TOR switch devices 210a and 210b may offload one or more control protocol(s) from the DPUs for which they were generated on a per-protocol basis. As such, the virtual networking devices provided by the TOR switch devices 210a and 210b may be configured by default to offload one or more (and in some cases all) of the control protocols from their corresponding DPUs, and may be configurable (e.g., by a network administrator or other user via a Command Line Interface (CLI)) to offload any particular control protocol(s) from their corresponding DPUs, (while allowing those DPUs to run the control protocol(s) that are not offloaded). As will be appreciated by one of skill in the art in possession of the present disclosure, control protocols not offloaded from a DPU may be handled by that DPU conventionally (e.g., with that DPU receiving corresponding control communications and in some cases responding to them as well).

To provide a specific example of per-protocol offloading, the virtual networking devices in the TOR switch devices 210a and 210b may be configured to offload the Border Gateway Protocol (BGP) and the Link Aggregation Control Protocol (LACP) from their corresponding DPUs, while allowing those DPUs to run the Link Layer Discovery Protocol (LLDP). However, while a few specific control protocols have been identified, one of skill in the art in possession of the present disclosure will appreciate how the virtual networking devices on the TOR switch devices 210a and 210b may be configured to offload any control protocols (or allow any control protocols to run on DPUs) while remaining within the scope of the present disclosure as well. Furthermore, while several different examples of the configuration of virtual networking devices for DPUs has been described, one of skill in the art in possession of the present disclosure will appreciate how the virtual networking devices of the present disclosure may be configured in a variety of manners that will enable the functionality described below while remaining within the scope of the present disclosure as well.

In some embodiments, following the configuration of the virtual networking devices provided by the TOR switch devices 210a and 210b, the agents 202b-208b running on the DPUs 202a-208a may be configured to operate with the virtual networking devices generated for them. For example, as discussed above, in some embodiments the agents 202b-208b running on the DPUs 202a-208a may initially be provided with relatively limited functionality that is configured to, for example, allow the DPUs 202a-208a to be discovered and configured as discussed above, and may be provided with any additional functionality after the discovery of their corresponding DPU 202a-208a and configuration of the virtual networking devices generated for those DPUs 202a-208a. As such, one of skill in the art in possession of the present disclosure will appreciate how any of a variety of configurations may be applied to the agents 202b-208b running on the DPUs 202a-208a following the configuration of their corresponding virtual networking devices in order to enable the functionality discussed below. However, as also discussed above, the provisioning of "fully functional" agents 202b-208b on the DPUs 202a-208a prior to DPU discovery and/or virtual networking device configuration is envisioned as falling within the scope of the present disclosure as well.

The method 400 may then proceed to optional block 408 where the networking device uses the virtual networking device to offload management operation(s) from the DPU. In an embodiment, at optional block 408, the virtual networking devices provided by the TOR switch devices 210a and 210b may perform any of a variety of management offload operations for the DPU for which they were generated. For example, with reference back to FIG. 8, the management offload operations at optional block 408 by either of the virtual networking devices (e.g., "PRIM. vDPU1" or "SEC. vDPU1") provided for a DPU (e.g., DPU 202a) may include management plane configuration of that DPU and synchronization of that configuration with the other virtual networking device as part of the management operations performed at block 408.

In another example, the management offload operations at optional block 408 may be performed in response to receiving a management command such as a "show" command at either of the TOR switch devices 210a and 210b (e.g., via a CLI or other management interface), with that management command including a virtual networking device identifier (e.g., an identifier for the "PRIM. vDPU1" or "SEC. vDPU1") for the DPU (e.g., the DPU 202a) at which it is directed, or may have its context set to the virtual networking device for the DPU to which it is directed (i.e., via the setting of the context to the virtual networking device for the DPU prior to providing that management command). As such, a management command for a DPU (e.g., the DPU 202a) may be provided to one of the virtual networking devices provided for that DPU (e.g., the "PRIM. vDPU1" or "SEC. vDPU1"), and that virtual networking device may execute that management command in a manner similar to conventional management command execution (e.g., using conventional CLI management command execution techniques that would be apparent to one of skill in the art in possession of the present disclosure).

In some specific examples, management command responses may be generated using information stored in a virtual networking device database (e.g., provided in the DPU control/management offload database 306 of the TOR switch device 300) utilized by the virtual networking device that received the management command. However, in other specific examples, a virtual networking device (e.g., the "PRIM. vDPU1" or "SEC. vDPU1") may generate management command responses (e.g., a response to a "learned MAC" management command, a "statistics" management command, etc.) by retrieving information from its DPU (e.g., the DPU 202a). However, while a few specific management offload operations have been described, one of skill in the art in possession of the present disclosure will appreciate how virtual networking devices generated for a DPU may offload any of a variety of management operations from that DPU while remaining within the scope of the present disclosure as well. Furthermore, one of skill in the art in possession of the present disclosure will appreciate how the management operations such as creation of a new VLAN in the networked system 200 may be enabled via the sending of a VLAN creation request to a networking administrator that manages the TOR switch devices 210a and 210b that are offloading the networking management functionality from the DPUs, rather than a compute administrator that manages the DPU node devices 202-208 that includes the DPUs 202a-208a that may be offloading processing operations from the TOR switch devices 210a and 210b.

The method 400 then proceeds to block 410 where the networking device uses the virtual networking device to offload control protocol(s) from the DPU. With reference back to FIG. 8, in an embodiment of block 410, the virtual networking devices (e.g., the "PRIM. vDPU1" or "SEC. vDPU1") provided by the TOR switch devices 210a and 210b may perform control protocol offload operations that offload one or more control protocols from the DPU (e.g., the DPU 202a) for which they were generated. For example, the control protocol offload operations at block 410 may include the virtual networking devices (e.g., the "PRIM. vDPU1" or "SEC. vDPU1") provided for a DPU (e.g., the DPU 202a) operating as a transit node for "north-to-south" control packets or other control communications received via the spine switch device(s) 212a and 212b and destined for that DPU.

In a specific example, the TOR switch sub-engine 304a in the DPU control/management offload engine 304 of either of the TOR switch devices 210a/300 or 210b/300 (e.g., a CPU in one of the TOR switch devices 210a or 210b) may intercept or otherwise receive a control communication via either of the spine switch devices 212a and 212b that is directed to a DPU (e.g., the DPU 202a), and then determine whether that control communication utilizes a control protocol that is being offloaded by the virtual networking devices (e.g., the "PRIM. vDPU1" or "SEC. vDPU1") for that DPU (e.g., based on the control protocol offload configuration of that virtual networking devices as discussed above). In the event that control communication does not utilize a control protocol that is being offloaded by the virtual networking devices for the DPU, the TOR switch sub-engine 304a may forward or otherwise provide that control communication to that DPU.

However, in the event that control communication utilizes a control protocol that is being offloaded by the virtual networking devices for the DPU, the TOR switch sub-engine 304a may redirect or otherwise provide that control communication to the one of those virtual networking devices (e.g., the "PRIM. vDPU1") in order to allow it to process that control communication. To provide a specific example of such control communication handling, a routing entry in the DPU control/management offload database 306 that is configured to provide for such redirection operations by the TOR switch sub-engine 304a may include an entry that is specific to the control protocol being offloaded by the virtual networking devices for a DPU, rather than a "generic" system flow entry in an Access Control List (ACL) table.

Furthermore, in some embodiments, the redirection or other provisioning of the control communication to the virtual networking device (e.g., the "PRIM. vDPU1") as discussed above may include the TOR switch sub-engine 304a in the DPU control/management offload engine 304 of either of the TOR switch devices 210a/300 or 210b/300 (e.g., a CPU in one of the TOR switch devices 210a or 210b) identifying a physical interface (e.g., "1/1" in the example) on the DPU (e.g., the DPU 202a) to which the control communication is directed and, in response, injecting or otherwise providing the control communication to the virtual networking device (e.g., the "PRIM. vDPU1") via the virtual interface (e.g., "vEth1" in the example above) that was provided for that virtual networking device and that corresponds to that physical interface on the DPU as discussed above.

In another example, the control protocol offload operations at block 410 may include the virtual networking devices (e.g., the "PRIM. vDPU1" or "SEC. vDPU1") provided for a DPU (e.g., the DPU 202a) handling control communications that were generated by the TOR switch device 210a or 210b providing those virtual networking devices. In such situations, the TOR switch sub-engine 304a in the DPU control/management offload engine 304 of either of the TOR switch devices 210a/300 or 210b/300 (e.g., a CPU in one of the TOR switch devices 210a or 210b) may generate a control communication for a DPU (e.g., the DPU 202a), and then determine whether that control communication utilizes a control protocol that is being offloaded by the virtual networking devices (e.g., the "PRIM. vDPU1" or "SEC. vDPU1") for that DPU (e.g., based on the control protocol offload configuration of that virtual networking devices as discussed above). In the event that control communication does not utilize a control protocol that is being offloaded by the virtual networking devices for the DPU, the TOR switch sub-engine 304a may forward or otherwise provide that control communication to that DPU.

However, in the event that control communication utilizes a control protocol that is being offloaded by the virtual networking devices for the DPU, the TOR switch sub-engine 304a may transmit or otherwise provide that control communication to the one of those virtual networking devices (e.g., the "PRIM. vDPU1") in order to allow it to process that control communication. Similarly as described above, the provisioning of the control communication to the virtual networking device may include providing the control communication to the virtual networking device (e.g., the "PRIM. vDPU1") via the virtual interface (e.g., "vEth1" in the example above) that was provided for that virtual networking device and that corresponds to the physical interface (e.g., "1/1" in the example above) on the DPU to which the control communication is directed.

In some embodiments, the processing of any of the control communications discussed above (or similar control communications) may include the virtual networking device (e.g., the "PRIM. vDPU1") programming the DPU (e.g., the DPU 202a) based on the control communication, programming at least one route in that virtual networking device, generating and transmitting a control communication response (e.g., to a source of the control communication via the spine switch device(s) 212a and/or 212b), and/or other control communication processing operations that would be apparent to one of skill in the art in possession of the present disclosure. As such, a primary virtual networking device provided for a DPU may handle control communications and hardware programming (e.g., route programming and/or other data plane programming), and some control communication processing/control plane operations may include the primary virtual networking device communicating with the agent in that DPU to provide for DPU kernel programming, hardware programming, and/or other data plane programming as well.

As discussed above, copies of the control communications processed by either the virtual networking device provided for a DPU by the TOR switch devices 210a and 210b may be shared with the other virtual networking device. As such, when a first virtual networking device (e.g., the "PRIM. vDPU1") receives and processes a control communication as described above to offload a control protocol from a DPU (e.g., the DPU 202a), it may replicate that control communication and provide that control communication to the second virtual networking device (e.g., the "SEC. vDPU1"), and one of skill in the art in possession of the present disclosure will appreciate how the second virtual networking device (e.g., the "SEC. vDPU1") may use that control communication to perform a variety of synchronization techniques that provide for the synchronization of its state with the first virtual networking device (e.g., the "PRIM. vDPU1") that enable, for example, High Availability (HA) processing operations.

As such, one of skill in the art in possession of the present disclosure will appreciate how only the primary virtual networking device for a DPU may transmit control communications (e.g., control packets) to that DPU, perform data plane programming of that DPU (e.g., via its agent), and/or perform other control operations with that DPU, while the secondary virtual networking device for that DPU may receive and process those control communications similarly as described for the primary virtual networking device, but without transmitting control communications to the DPU and/or performing data plane programming on the DPU like the primary virtual networking device (e.g., the control communication transmission and data plane programming threads in the secondary virtual networking device may be blocked). As such, while either of the primary virtual networking device and the secondary networking device for a DPU may receive, process, and exchange control packets or other control communications for a DPU, only the primary virtual networking device may program routes and/or perform other hardware programming associated with that DPU.

In another example, the control protocol offload operations at block 410 may include handling control packets or other control communications associated with a DPU and directed to either of the TOR switch devices 210a or 210b. In some embodiments, the virtual networking devices for a DPU may generate control communications that are directed to the TOR switch sub-engine 304a in the DPU control/management offload engine 304 of either of the TOR switch devices 210a/300 or 210b/300 due to, for example, an offloaded control protocol requiring a control communication reply or other control communication. In such situations, the virtual networking device may determine whether that control communication that is destined for the TOR switch device 210a or 210b (e.g., whether that control packet or other control communication is a "link-scope" transmission), or whether that control communication is destined for a destination device coupled to the TOR switch device 210a or 210b via a network (e.g., whether that control packet or other control communication is a "global-scope" transmission).

In the event the control communication is destined for the TOR switch device 210a or 210b, the virtual networking devices (e.g., the "PRIM. vDPU1") may transmit that control communication via the virtual interface (e.g., "vEth1" in the example above) that was provided for that virtual networking device and that corresponds to a physical interface (e.g., "1/1" in the example above) on its DPU, and to the TOR switch sub-engine 304a in the DPU control/management offload engine 304 in that TOR switch device 210a/300 or 210b/300. In the event the control communication is destined for a destination device coupled to the TOR switch device 210a or 210b via a network, the virtual networking devices (e.g., the "PRIM. vDPU1") may inject or otherwise provide that control communication to an ingress pipeline in that TOR switch device in a manner that simulates the receiving of that control communication from the DPU (e.g., the DPU 202a).

In embodiments in which the control communication handling discussed above requires Address Resolution Protocol (ARP) resolution, neighbor resolution, or similar operations to allow for a control communication response to other control communication handling, the virtual networking device (e.g., the "PRIM. vDPU1") may transmit a request to its DPU (e.g., the DPU 202a) to provide for such ARP resolution, neighbor resolution, or similar operations (along with any information required to perform such resolution or other operations), and that DPU may perform such resolution or other operations in order to trigger the control communication response or other control communication, and may update the virtual networking device (e.g., via internal messages) about the completion of that control communication handling.

In another example, the control protocol offload operations at block 410 may include virtual networking devices that are provided for different DPUs exchanging control communications between each other. For example, DPUs (e.g., the DPU 202a and the DPU 204a) may be connected and configured to communicate directly with each other, and thus respective virtual networking devices (e.g., "PRIM. vDPU1" and "PRIM. vDPU2") for those DPUs may exchange control communications directly if those control communications include the control protocol(s) being offloaded by those virtual networking devices from those DPUs. Furthermore, in addition to control protocol offload operations, utilities may be made available via the virtual networking devices and may allow, for example, a network administrator or other user to perform debugging on a DPU (e.g., the DPU 202a) by accessing a DPU shell for that DPU via one of the virtual networking devices (e.g., the "PRIM. vDPU1" or "SEC. vDPU1") provided for that DPU, with that DPU shell allowing the network administrator to initiate debugging on that DPU via that virtual networking device (e.g., using an in-band connection between that virtual networking device and that DPU). As such, in addition to control protocol offloads, the virtual networking devices may enable a user to login to their corresponding DPUs via the TOR switch devices 210a and 210b.

Thus, systems and methods have been described that provide a networking device that offloads control protocols and/or management operations from DPUs. For example, the DPU control/management offload system of the present disclosure may include a first networking device that is coupled to a DPU. The first networking device identifies the DPU, and generates a first virtual networking device in the first networking device for the DPU. The first networking device then offloads control protocol(s) and/or management operation(s) from the DPU using the first virtual networking device, which may include receiving a control communication that is directed to the DPU, determining that the control communication utilizes the control protocol(s) and, in response, redirecting the control communication to the first virtual networking device and processing the control communication using the first virtual networking device. The processing the control communication using the first virtual networking device may include at least one of: programming the DPU based on the control communication, programming route(s) in the first virtual networking device, or transmitting a control communication response. As such, resources of DPUs may be conserved and optimized for performing data processing operations via the offloading of control protocols and/or management operations by a connected networking device, allowing a rack of DPU node devices including DPUs to be centrally managed from the networking devices in that rack, while offloading a DPU control plane to those networking devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Data Processing Unit (DPU) control/management offload system, comprising:
   a Data Processing Unit (DPU) that is configured to offload data processing operations from at least one processing system; and
   a first networking device that is coupled to the DPU, wherein the first networking device is configured to:
      identify the DPU;
      generate a first virtual networking device in the first networking device for the DPU; and
      offload, from the DPU using the first virtual networking device, at least one control protocol for performing the data processing operations by the DPU.

2. The system of claim 1, wherein the first networking device is configured to:
   offload, from the DPU using the first virtual networking device while the DPU runs a first control protocol, a second control protocol for performing the data processing operations by the DPU.

3. The system of claim 1, wherein the offloading the at least one control protocol from the DPU using the first virtual networking device includes:
receiving a control communication that is directed to the DPU;
determining that the control communication utilizes the at least one control protocol;
redirecting, in response to determining that the control communication utilizes the at least one control protocol, the control communication to the first virtual networking device; and
processing the control communication using the first virtual networking device.

4. The system of claim 3, wherein redirecting the control communication to the first virtual networking device includes:
identifying a physical interface on the DPU to which the control communication is directed; and
providing the control communication to the first virtual networking device via a virtual interface that is provided for the first virtual networking device and that corresponds to the physical interface on the DPU.

5. The system of claim 3, wherein the first virtual networking device provides a primary virtual networking device for the DPU, and wherein the first networking device is configured to:
generate and transmit a copy of the control communication to a second virtual networking device that provides a secondary virtual networking device for the DPU and that is provided by a second networking device that is coupled to the first networking device.

6. The system of claim 3, wherein the processing the control communication using the first virtual networking device includes at least one of:
programming the DPU based on the control communication;
programming at least one route in the first virtual networking device; or
transmitting a control communication response.

7. The system of claim 1, wherein the first virtual networking device provides a primary virtual networking device for the DPU, and wherein the system further comprises:
a second networking device that is coupled to the DPU and that is configured to:
identify the DPU;
generate a second virtual networking device in the second networking device that provides a secondary virtual networking device for the DPU; and
offload, from the DPU using the second networking device, the at least one control protocol for performing the data processing operations by the DPU.

8. An Information Handling System (IHS), comprising:
a processing system; and
a memory system that is coupled to the processing system and that includes instructions that, when executed by the processing system, cause the processing system to provide a Data Processing Unit (DPU) control/management offload engine that is configured to:
identify a DPU that is configured to offload data processing operations from at least one processor;
generate a first virtual networking device in the IHS for the DPU; and
offload, from the DPU using the first virtual networking device, at least one control protocol for performing the data processing operations by the DPU.

9. The IHS of claim 8, wherein the DPU control/management offload engine is configured to:
offload, from the DPU using the first virtual networking device while the DPU runs a first control protocol, a second control protocol for performing the data processing operations by the DPU.

10. The IHS of claim 8, wherein the offloading the at least one control protocol from the DPU using the first virtual networking device includes:
receiving a control communication that is directed to the DPU;
determining that the control communication utilizes the at least one control protocol;
redirecting, in response to determining that the control communication utilizes the at least one control protocol, the control communication to the first virtual networking device; and
processing the control communication using the first virtual networking device.

11. The IHS of claim 10, wherein redirecting the control communication to the first virtual networking device includes:
identifying a physical interface on the DPU to which the control communication is directed; and
providing the control communication to the first virtual networking device via a virtual interface that is provided for the first virtual networking device and that corresponds to the physical interface on the DPU.

12. The IHS of claim 10, wherein the first virtual networking device provides a primary virtual networking device for the DPU, and wherein the DPU control/management offload engine is configured to:
generate and transmit a copy of the control communication to a second virtual networking device that provides a secondary virtual networking device for the DPU and that is provided by a second networking device that is coupled to the processing system.

13. The IHS of claim 10, wherein the processing the control communication using the first virtual networking device includes at least one of:
programming the DPU based on the control communication;
programming at least one route in the first virtual networking device; or
transmitting a control communication response.

14. A method for offloading control and management from a Data Processing Unit (DPU), comprising:
identifying, by a first networking device, a DPU that is configured to offload data processing operations from at least one processing system;
generating, by the first networking device, a first virtual networking device in the first networking device for the DPU; and
offloading, by the first networking device from the DPU using the first virtual networking device, at least one control protocol for performing the data processing operations by the DPU.

15. The method of claim 14, further comprising:
offloading, by the first networking device from the DPU using the first virtual networking device while the DPU runs a first control protocol, a second control protocol for performing the data processing operations by the DPU.

16. The method of claim 14, wherein the offloading the at least one control protocol from the DPU using the first virtual networking device includes:
  receiving, by the first networking device, a control communication that is directed to the DPU;
  determining, by the first networking device, that the control communication utilizes the at least one control protocol;
  redirecting, by the first networking device in response to determining that the control communication utilizes the at least one control protocol, the control communication to the first virtual networking device; and
  processing, by the first networking device, the control communication using the first virtual networking device.

17. The method of claim 16, wherein redirecting the control communication to the first virtual networking device includes:
  identifying, by the first networking device, a physical interface on the DPU to which the control communication is directed; and
  providing, by the first networking device, the control communication to the first virtual networking device via a virtual interface that is provided for the first virtual networking device and that corresponds to the physical interface on the DPU.

18. The method of claim 16, wherein the first virtual networking device provides a primary virtual networking device for the DPU, and wherein the method further comprises:
  generating and transmitting, by the first networking device, a copy of the control communication to a second virtual networking device that provides a secondary virtual networking device for the DPU and that is provided by a second networking device that is coupled to the first networking device.

19. The method of claim 16, wherein the processing the control communication using the first virtual networking device includes at least one of:
  programming, by the first networking device, the DPU based on the control communication;
  programming, by the first networking device, at least one route in the first virtual networking device; or
  transmitting, by the first networking device, a control communication response.

20. The method of claim 14, further comprising:
  identifying, by a second networking device that is coupled to the first networking device, the DPU;
  generating, by the second networking device, a second virtual networking device in the second networking device for the DPU; and
  offloading, by the first networking device from the DPU using the second networking device, at least one control protocol for performing the data processing operations by the DPU.

* * * * *